US011317490B2

(12) United States Patent
Qiu et al.

(10) Patent No.: US 11,317,490 B2
(45) Date of Patent: Apr. 26, 2022

(54) INPUT DETECTION AND PROTECTION CIRCUIT

(71) Applicant: Lumlux Corp, Suzhou (CN)

(72) Inventors: Ming Qiu, Suzhou (CN); YuXing Jin, Suzhou (CN); GuanXing Deng, Suzhou (CN)

(73) Assignee: Lumlux Corp, Jiangsu (CN)

( * ) Notice: Subject to any disclaimer, the term of this patent is extended or adjusted under 35 U.S.C. 154(b) by 43 days.

(21) Appl. No.: 16/309,283

(22) PCT Filed: Dec. 29, 2017

(86) PCT No.: PCT/CN2017/120349
§ 371 (c)(1),
(2) Date: Dec. 12, 2018

(87) PCT Pub. No.: WO2019/080359
PCT Pub. Date: May 2, 2019

(65) Prior Publication Data
US 2021/0219397 A1  Jul. 15, 2021

(30) Foreign Application Priority Data
Oct. 25, 2017 (CN) .......................... 201711014976.4

(51) Int. Cl.
| H02M 1/32 | (2007.01) |
| H05B 45/355 | (2020.01) |
| H05B 45/50 | (2022.01) |
| H05B 41/292 | (2006.01) |

(52) U.S. Cl.
CPC ......... *H05B 45/355* (2020.01); *H05B 41/292* (2013.01); *H05B 45/50* (2020.01)

(58) Field of Classification Search
CPC .... H02M 1/32; H02M 1/4208; H02M 1/4225; H02M 7/062; H05B 41/292; H05B 45/50; H05B 45/355
See application file for complete search history.

(56) References Cited

U.S. PATENT DOCUMENTS

| 8,767,415 B2 * | 7/2014 | Chen ................. H02M 3/33507 |
| | | 363/16 |
| 9,337,744 B1 * | 5/2016 | Tsyrganovich ....... H02M 7/062 |
| 9,484,771 B2 * | 11/2016 | Braylovskiy ........... H02J 9/061 |
| 9,820,351 B1 * | 11/2017 | Xiong ................... H05B 45/50 |

(Continued)

FOREIGN PATENT DOCUMENTS

| CN | 2688016 Y | 3/2005 |
| CN | 201171242 Y | 12/2008 |
| CN | 103427618 A | 12/2013 |

*Primary Examiner* — Tung X Le
(74) *Attorney, Agent, or Firm* — Vivacqua Crane PLLC

(57) ABSTRACT

An input detection and protection circuit and an AC electronic ballast for HID lamps, including a power input circuit performing a first limitation to an input surge voltage and then performing a second limitation to a residual voltage from the first input surge voltage limitation; an input voltage acquisition circuit feeding back an input voltage to an MCU chip; a pull-in circuit for a relay connecting to a relay in the power input circuit; a PFC circuit, and an MCU chip controlling the PFC circuit to switch on and off according to voltage values input by the input voltage acquisition circuit, and controlling pull-in and drop-out of the relay through the pull-in circuit for the relay.

10 Claims, 2 Drawing Sheets

(56) References Cited

U.S. PATENT DOCUMENTS

| | | | |
|---|---|---|---|
| 2011/0164339 A1* | 7/2011 | Schmid | H02M 1/4208 361/18 |
| 2013/0127358 A1* | 5/2013 | Yao | H05B 45/38 363/21.02 |
| 2015/0311805 A1* | 10/2015 | Yamashita | H02M 1/34 363/21.01 |

* cited by examiner

INPUT DETECTION AND PROTECTION CIRCUIT

TECHNICAL FIELD

The present disclosure relates to the technical field of power supply, in particular to an input detection and protection circuit.

BACKGROUND

Development of power supply technology including electronic ballast, LED driver, power bank and the like has started many years ago, and applications on such technology are becoming more and more mature, especially in agriculture and in energy-saving renovation of street lamp recently. The differences in diversified demands of the market have promoted a huge product family, with a wide variety of products, a common power ranges from 70 W to 1000 W, and common voltages including 120 V, 208 V, 220 V, 230 V, 240 V, 277 V, 347 V, 380 V, 400 V, 480 V, etc. due to different standards of voltages in different countries. It is not hard to see from the above voltage specifications that the power distribution environments where various power supplies locate could be complex, so attention must be paid to the rated voltage range of products and the environments of grid during installation.

To be further understood, the use environment can be divided into household use at single voltage, medium-scale power supply to motors, and grid distribution in large-scale industrial applications. Therefore, the voltage environments of the grid are complex. When In use, an input surge voltage is monitored to reach several kilovolts, and the fluctuation and instability of the grid reach more than 30% when, far exceeding the designed withstand voltage of products, thus the main cause for failures is such rugged grid environments. According to failure analysis, there are several main causes as follows for a large number of damages:

One cause is the misuse of two live wires in the 3-phase 4-wire power distribution, where the actual input voltage is 1.7 times the nominal value. For example, when a product with a nominal rated voltage of 230 V is connected to a wrong wire, it has a voltage of up to 400 VAC, which greatly exceeds a withstand voltage thereof. A second cause is that the grid has a voltage surge exceeding the withstand voltage of internal devices of the product, due to its instability of the grid, resulting in damage to electrolytic capacitors and MOS transistors. A third cause is the three-phase imbalance caused by neutral line phase loss, where one phase voltage exceeds an input rating, resulting in damage to internal electrolytic capacitors and MOS transistors. A fourth cause is a surge voltage induced at the moment of lightning or of switching on. A fifth cause is a rapid change of high current when the input capacitor is charged, which results in an induced high voltage generated when the current reduces.

After an observation of a long-term usage, it can be found that the damage caused by abnormal input voltage accounts for more than 60% of all failure rates, wherein the failure rate in the household use environment is obviously lower than that in industrial applications since there is no multiple service voltages in the household use environment. The failure rate in the usages of motor is significantly higher than that in the usages of grid. The probability of damage at the moment of switching on and off is greater than that in normal operation, and the failure rate in the thunderstorm weather is higher than that in the sunny weather.

Therefore, the present disclosure proposes improvements in view of the above problems.

SUMMARY

The present disclosure aims to provide an input detection and protection circuit as improvements with respect to the prior arts.

In order to address the above issues, a technical scheme according to the present disclosure is provided as follows:

An input detection and protection circuit, wherein the input detection and protection circuit includes a power input circuit, an input voltage acquisition circuit, a pull-in circuit for a relay, a PFC circuit and an MCU chip.

The power input circuit performs a first limitation to an input surge voltage, and then performs a second limitation to a residual voltage from the first input surge voltage limitation; the input voltage acquisition circuit feeds back an input voltage to the MCU chip, the pull-in circuit for a relay is connected to a relay in the power input circuit, and the MCU chip controls the PFC circuit to switch on and off according to voltage values input by the input voltage acquisition circuit, and controls pull-in and drop-out of the relay through the pull-in circuit for the relay.

As an improvement of the input detection and protection circuit according to the present disclosure, the power input circuit includes: a first varistor, a second varistor, a thermistor and the relay, and the input surge voltage is firstly limited by the first varistor and then secondly limited by the second varistor and the thermistor.

As an improvement of the input detection and protection circuit according to the present disclosure, the power input circuit further includes a third varistor connected in parallel to both ends of the thermistor.

As an improvement of the input detection and protection circuit according to the present disclosure, the input voltage acquisition circuit includes:

a first diode, a second diode, a first capacitor, a second capacitor, a first resistor and a second resistor; one end of each of the first and second diodes is connected to the power input circuit and the other end thereof is connected to the MCU chip through the first and second capacitors and the first and second resistors.

As an improvement of the input detection and protection circuit according to the present disclosure, when the input voltage is within a safe range, the MCU chip controls the pull-in of the relay through the pull-in circuit for the relay, and when the input voltage is out of the safe range, the relay is dropped-out.

As an improvement of the input detection and protection circuit according to the present disclosure, the input voltage acquisition circuit includes: a third resistor, a fourth resistor and a third capacitor; one end of the third capacitor is connected to the PFC circuit and the other end thereof is connected to the MCU chip through the third resistor and the third capacitor.

As an improvement of the input detection and protection circuit according to the present disclosure, when the input voltage is within a safe range, the MCU chip controls the PFC circuit to be switched on; and when the input voltage is out the safe range, the MCU chip controls the PFC circuit to be switched off.

As an improvement of the input detection and protection circuit according to the present disclosure, the pull-in circuit for the relay includes a triode, a fifth resistor, a sixth resistor and a fourth capacitor, a collector of the triode is connected to the relay, and the collector and an emitter of the triode are electrically connected to the MCU chip through the fifth resistor, the sixth resistor and the fourth capacitor.

As an improvement of the input detection and protection circuit according to the present disclosure, the input detection and protection circuit further includes a power supply module that supplies power to the relay and the MCU chip.

As compared with existing technologies, the present disclosure has beneficial effects that the input detection and protection circuit according to the present disclosure can provide protection against abnormalities due to extremely high input voltage, such as phase loss from the grid, incorrect wire connection during installation, high surge voltage at the moment of switching on, impulses by continuous lightning. According to the present disclosure, the input detection and protection circuit acquires a charging voltage of a capacitor of a subsequent stage, and enables the pull-in of the relay according to the internal setting in order to effectively reduce surge current and impact. Meanwhile, the input detection and protection circuit monitors the input voltage, such that protection can be provided when the voltage is extremely high or low, wherein the relay can be dropped-out in case of an abnormality, and a standby current can be provided to the MCU by PTC to indicate such abnormality.

BRIEF DESCRIPTION OF THE DRAWINGS

In order to better illustrate embodiments of the present disclosure or technologies in the prior art, the accompanying drawings to be used in the embodiments or existing technologies will be briefly described below. Obviously, the drawings in the following description are only a part of embodiments described in the present disclosure, and a person of ordinary skill in the art may also obtain other drawings based on these drawings without creative effort.

DETAILED DESCRIPTION

The technical schemes in the embodiments of the present disclosure will be clearly and completely described as below with reference to the accompanying drawings in the embodiments of the present disclosure. Obviously, the described embodiments are only a part of, not all of, the embodiments of the present disclosure. All other embodiments obtained by a person of ordinary skill in the art based on the embodiments of the present disclosure without creative effort shall fall into the protection scope of the present disclosure.

Figure 1A:
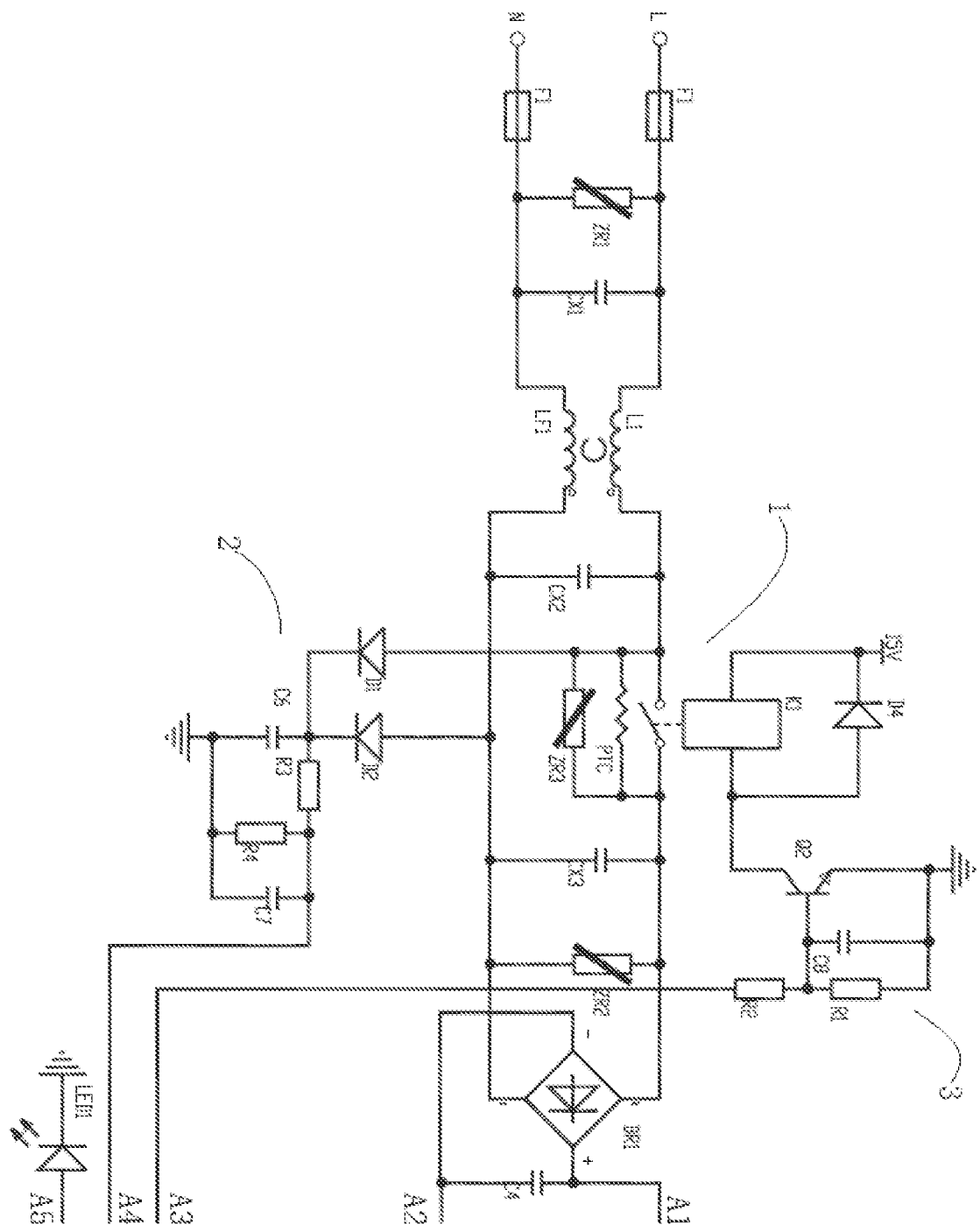
FIG. 1A is a first portion of a circuit diagram of an embodiment of an input detection and protection circuit according to the present disclosure.
Figure 1B:
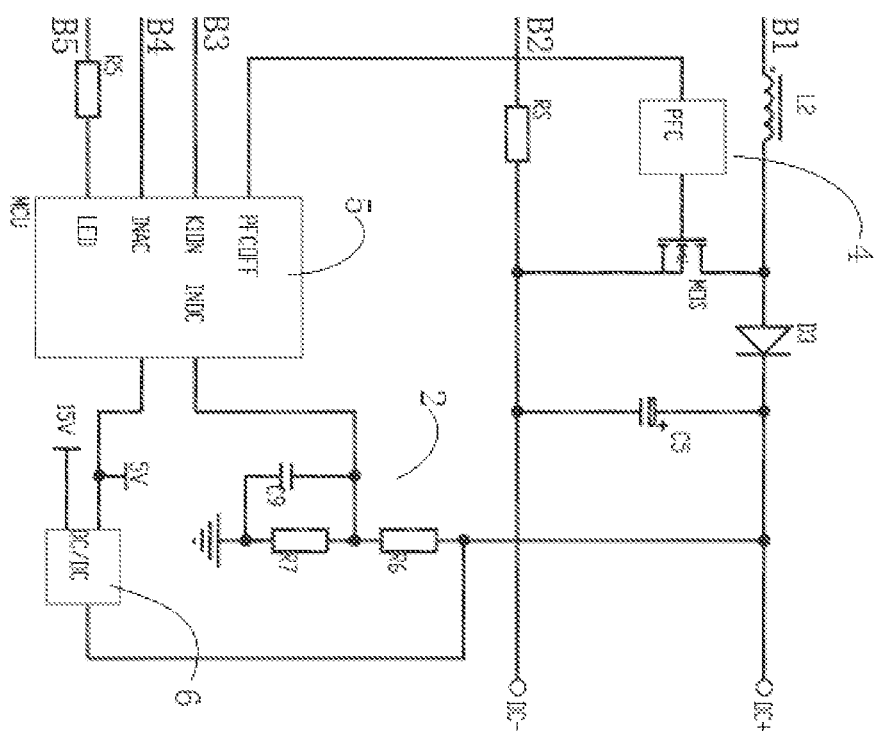
FIG. 1B is a second portion of the circuit diagram of the embodiment of the input detection and protection circuit.

As shown in FIG. 1A and continued on FIG. 1B, an input detection and protection circuit according to the present disclosure is provided for input detection, wherein the input detection and protection circuit includes a power input circuit 1, an input voltage acquisition circuit 2, a pull-in circuit 3 for a relay, a PFC circuit 4 and an MCU chip 5. Lines A5, A4, A3, A2, and A1 shown in FIG. 1A are in connection with lines B5, B4, B3, B2, and B1, respectively, shown in FIG. 1B.

The power input circuit 1 is configured to limit an input surge voltage for the first time and then limit the residual voltage for the second time after that. Specifically, the power input circuit 1 includes: a first varistor ZR1, a second varistor ZR2, a thermistor PTC and a relay K1. The input surge voltage is limited by the first varistor ZR1, and then by the second varistor ZR2 and the thermistor PTC. The power input circuit 1 further includes: a third varistor ZR3 which is connected in parallel to both ends of the thermistor PTC and configured to protect the thermistor PTC.

Therefore, when the input voltage is too high, the thermistor PTC and the second varistor ZR2 in the circuit will limit such voltage, the thermistor PTC exhibits a high impedance, the voltage is controlled at a safe value by the second varistor ZR2, the voltage endurance capability of the thermistor PTC is above 300 VAC and exhibits a high impedance during overcurrent. When an input stage voltage is higher than a limiting voltage of the second varistor ZR2, the residual voltage is applied to the thermistor PTC to realize enhanced protection for a subsequent stage of the circuit. In case of phase loss during input, the input voltage will be 1.73 times the rated voltage. Taking a voltage of 230 V as an example, in case of the most serious phase loss, a rectified voltage will ranges from 550 V to 600 V, while electrolytic capacitors of a subsequent stage are generally DC electrolytic capacitors of 450 to 500 V, thus resulting in overvoltage damage to the electrolytic capacitors. Therefore, the power input circuit 1 can effectively prevent damage to devices.

The input voltage acquisition circuit 2 feeds back the input voltage to the MCU chip 5. Specifically, the input voltage acquisition circuit 2 includes: a first diode D1, a second diode D2, a first capacitor C6, a second capacitor C7, a first resistor R3 and a second resistor R4, wherein one end of the first diode D1 and one end of the second diode D2 is respectively connected to the power input circuit 1, and the other end thereof is respectively connected to the MCU chip 5 through the first capacitor C6, the second capacitor C7, the first resistor R3 and the second resistor R4.

In this case, the MCU chip 5 determines whether to pull-in the relay K1 according to the value of the input voltage. Relay K1 is not to be pulled-in when such value exceeds a safe value of the circuit, and the voltage will then be limited within a safe range by the second varistor ZR2 and the thermistor PTC. After the input voltage falls within the safe range, the MCU chip 5 calculates a reasonable delay pull-in time according to the voltage applied on the electrolytic capacitor, and controls a surge current at a possibly lowest level. Otherwise, if the relay K1 is pulled-in during an over high voltage input, the capacitor C5 will be damaged due to overvoltage. If the relay K1 is pulled-in prematurely when the voltage on the capacitor C5 is still at a low value, the surge current will be very large at the moment of pull-in, and a soft start-up will not be implemented.

The input voltage acquisition circuit 2 further includes: a third resistor R6, a fourth resistor R7 and a third capacitor C9, wherein one end of the third capacitor C9 is connected to the PFC circuit 4 and the other end thereof is connected to the MCU chip 5 through the third resistor R6 and the third capacitor C9.

In this case, when the input voltage is within a safe range, the MCU chip 5 controls the PFC circuit 4 to be switched on, and when the input voltage is out of the safe range, the MCU chip 5 controls the PFC circuit 4 to be switched off. Thus, power consumption is minimized to satisfy a standby power consumption of less than 1 W.

The pull-in circuit 3 for the relay K1 is connected to the relay K1 in the power input circuit 1, the pull-in circuit 3 is configured to control the pull-in of the relay K1 under the control of the MCU chip 5. Specifically, the pull-in circuit 3 for the relay K1 includes a triode Q2, a fifth resistor R1, a sixth resistor R2 and a fourth capacitor C8, wherein a collector of the triode Q2 is connected to the relay K1, and the collector and an emitter of the triode Q2 are electrically connected to the MCU chip 5 through the fifth resistor R1, the sixth resistor R2 and the fourth capacitor C8.

The MCU chip 5 is configured to control the PFC circuit 4 to be switched on and off according to voltage values input by the input voltage acquisition circuit 2, and control the pull-in and drop-out of the relay K1 through the pull-in circuit 3 for the relay K1.

Specifically, the MCU chip 5 is provided with a first input pin INAC and a second input pin INDC which are connected to the input voltage acquisition circuit 2, and is also provided with a first output pin K1ON and a second output pin PFCOFF which are connected to the pull-in circuit 3 for the relay K1 and the PFC circuit 4 respectively.

Hence, the first input pin INAC detects the input voltage, sends a pull-in signal to relay K1 through the first output pin K1ON after performing an AD conversion and judgement, and drop out the relay K1 in case of any abnormality. When the relay K1 is dropped-out, the current is only supplied to a power supply module for a subsequent stage through the thermistor PTC in order to secure a standby, therefore such time sequence of pull-in of the relay K1 can effectively suppress an input inrush current. The relay K1 is pulled-in only when the MCU chip 5 detects that an electrolytic capacitor is charged and a certain condition is met, thereby not only reducing the duration of applied surge current, but also reducing a peak in the applied surge current, the switching capacity needed in power distribution and the surge interference from the grid. Further, an output signal of the second output pin PFCOFF can switch off the PFC circuit and a subsequent stage thereafter, so as to minimize power consumption, in order to satisfy a standby power consumption of less than 1 W. In one embodiment, the model of the MCU chip 5 is PIC16F1716-I/SS.

In addition, the MCU chip 5 is also provided with an LED indicator interface which can indicate a detection result effectively. By setting a lower and upper limit for a protection voltage and a safe working voltage, the MCU chip 5 can indicate overvoltage, phase loss, low voltage, lightning and other states with different LED flickers, thus facilitating maintenance by customers and reducing potential electric shock hazards.

The input detection and protection circuit further includes a power supply module 6 that supplies power to the relay K1 and MCU chip 5. The power supply module 6 does not use a high-voltage electrolytic capacitor such that stability of the power supply module 6 is greatly increased. The power supply module 6 can output voltages of 15V and 5V to provide working voltages respectively to the relay K1 and the chip.

It will be understood by those skilled in the art that the principle, circuit configuration and technical effects of the input detection and protection circuit according to the present disclosure can be applied to various electronic device such as an AC electronic ballast including the input detection and protection circuit as described above.

In summary, the input detection and protection circuit according to the present disclosure can provide protection against abnormalities due to extremely high input voltage, such as phase loss from the grid, incorrect wire connection during installation, high surge voltage at the moment of switching on, impulses by continuous lightning. According to the present disclosure, the input detection and protection circuit acquires a charging voltage of a capacitor of a subsequent stage, and enables the pull-in of the relay according to the internal setting in order to effectively reduce surge current and impact. Meanwhile, the input detection and protection circuit monitors the input voltage, such that protection can be provided when the voltage is extremely high or low, wherein the relay can be dropped-out in case of an abnormality, and a standby current can be provided to the MCU by PTC to indicate such abnormality.

It will be apparent to a person of ordinary skill in the art that the present disclosure is not limited to the details of the exemplary embodiments described above, but can be embodied in other specific forms without departing from the spirit or essential characteristics thereof. Therefore, the embodiments shall be in all respects regarded as exemplary and non-limiting, and the scope of the present disclosure is defined by the appended claims rather than the above description, so it is intended to include all changes that fall within the meaning and scope of equivalent elements of the claims in the present disclosure. Any reference numerals in the claims shall not be taken as limiting the claims in which they involve.

In addition, it should be understood that although this specification is described in terms of embodiments, however it should not be considered that each embodiment contains one independent technical scheme. This description of the specification is merely for clarity. A person of ordinary skill in the art shall take the specification as a whole, and the technical schemes in each embodiment can be appropriately combined to form other embodiments that can be understood by a person of ordinary skill in the art.

The invention claimed is:

1. An input detection and protection circuit, wherein the input detection and protection circuit comprising:
   a power input circuit, wherein the power input circuit performs a first limitation to an input surge voltage, and then performs a second limitation to a residual voltage from the first input surge voltage limitation;
   an input voltage acquisition circuit, wherein the input voltage acquisition circuit feeds back an input voltage to an MCU chip of the input detection and protection circuit;
   a pull-in circuit for a relay, wherein the pull-in circuit for the relay is connected to the relay in the power input circuit; and
   a PFC circuit,
   wherein the MCU chip controls the PFC circuit to switch on and off according to voltage values input by the input voltage acquisition circuit, and controls pull-in and drop-out of the relay through the pull-in circuit for the relay; and
   the power input circuit comprises: a first varistor, a second varistor, a thermistor and the relay, and wherein the input surge voltage is firstly limited by the first varistor and then secondly limited by the second varistor and the thermistor.

2. The input detection and protection circuit according to claim 1, wherein the power input circuit further comprises a third varistor connected in parallel to both ends of the thermistor.

3. The input detection and protection circuit according to claim 1,
   wherein the input voltage acquisition circuit comprises: a first diode, a second diode, a first capacitor, a second capacitor, a first resistor and a second resistor; and
   wherein one end of each of the first and second diodes is connected to the power input circuit and the other end thereof is connected to the MCU chip through the first and second capacitors and the first and second resistors.

4. The input detection and protection circuit according to claim 3, wherein when the input voltage is within a certain safe range, the MCU chip controls the pull-in of the relay through the pull-in circuit for the relay, and when the input voltage is out of the safe range, the relay is dropped-out.

5. The input detection and protection circuit according to claim 1, wherein when the input voltage is within a certain safe range, the MCU chip controls the pull-in of the relay through the pull-in circuit for the relay, and when the input voltage is out of the safe range, the relay is dropped-out.

6. The input detection and protection circuit according to claim 5, wherein when the input voltage is within the certain safe range, the MCU chip controls the PFC circuit to be switched on, and when the input voltage is out the safe range, the MCU chip controls the PFC circuit to be switched off.

7. The input detection and protection circuit according to claim 1,
wherein the input voltage acquisition circuit comprises: a third resistor, a fourth resistor and a third capacitor; and
wherein one end of the third capacitor is connected to the PFC circuit and the other end thereof is connected to the MCU chip through the third resistor and the third capacitor.

8. The input detection and protection circuit according to claim 1, wherein when the input voltage is within a certain safe range, the MCU chip controls the PFC circuit to be switched on, and when the input voltage is out the safe range, the MCU chip controls the PFC circuit to be switched off.

9. The input detection and protection circuit according to claim 1, wherein the pull-in circuit for the relay includes a triode, a fifth resistor, a sixth resistor and a fourth capacitor, a collector of the triode is connected to the relay, and the collector and an emitter of the triode are electrically connected to the MCU chip through the fifth resistor, the sixth resistor and the fourth capacitor.

10. The input detection and protection circuit according to claim 1, wherein the input detection and protection circuit further includes a power supply module that supplies power to the relay and the MCU chip.

* * * * *